United States Patent [19]

Treu

[11] Patent Number: 4,468,577

[45] Date of Patent: Aug. 28, 1984

[54] MINIMIZATION OF MOTOR SLIP AT SYNCHRONOUS SPIN FREQUENCY OF AN INSIDE-OUT HYSTERESIS SYNCHRONOUS MOTOR

[75] Inventor: Dennis M. Treu, Cedar Rapids, Iowa

[73] Assignee: Rockwell International Corporation, El Segundo, Calif.

[21] Appl. No.: 496,046

[22] Filed: May 19, 1983

[51] Int. Cl.³ .................... G01C 19/08; H02K 49/04
[52] U.S. Cl. ...................................... 310/105; 74/5.7; 310/103
[58] Field of Search .................. 310/102 A, 103, 104, 310/105, 166, 190, 192, 67, 92, 106; 74/5.7; 75/123 K, 123 R; 148/23; 73/504

[56] References Cited

U.S. PATENT DOCUMENTS

| | | | |
|---|---|---|---|
| 3,512,020 | 5/1970 | Konet | 74/5.7 |
| 4,234,260 | 11/1980 | Frischmann et al. | 75/123 K |
| 4,256,516 | 3/1981 | Ouchi et al. | 75/123 K |
| 4,283,959 | 8/1981 | Strittmatter et al. | 74/352 |
| 4,444,053 | 4/1984 | Rider | 73/504 |

Primary Examiner—J. D. Miller
Assistant Examiner—D. L. Rebsch
Attorney, Agent, or Firm—Edward A. Gerlaugh; Robert C. Mayes; H. Fredrick Hamann

[57] ABSTRACT

An inside-out hysteresis synchronous motor for use with inertial sensors and having a hysteresis ring magnetically isolated from the motor structure while maintaining the thermal expansion loop of the motor structure.

3 Claims, 1 Drawing Figure

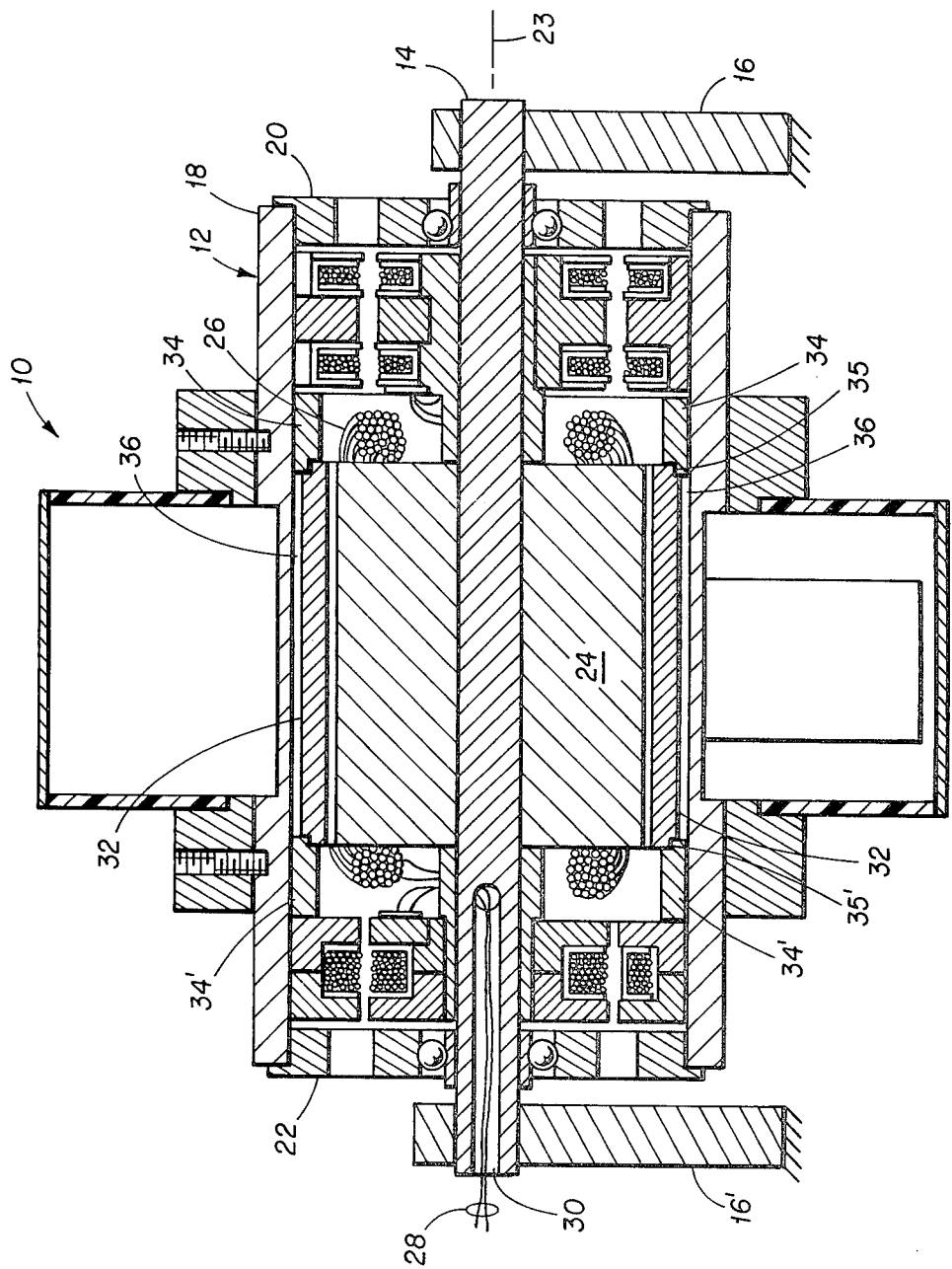

MINIMIZATION OF MOTOR SLIP AT SYNCHRONOUS SPIN FREQUENCY OF AN INSIDE-OUT HYSTERESIS SYNCHRONOUS MOTOR

BACKGROUND OF THE INVENTION

The invention relates to electric motors, and more particularly, to the structure of an inside-out hysteresis synchronous motor.

Inside-out motors are characterized by a fixed shaft or stator, and an externally disposed rotating structure. Such motors are commonly used to provide motive power for rotating gyroscopic apparatus, and the like. One such motor is disclosed in a co-pending application, Ser. No. 370,641 entitled "Sensor Assembly for Strapped-Down Attitude and Heading Reference System" by B. F. Rider now U.S. Pat. No. 4,444,053, which is assigned to the same assignee as the instant invention. Synchronous motors operating in a varying thermal environment often exhibit unacceptable slip, i.e., the difference between synchronous and operating speeds, as ambient temperature changes. The thermal expansion loops in the motor structure must remain matched over temperature extremes in order to maintain the preload on the motor bearings.

It is, therefore, an object of the instant invention to provide an improved hysteresis synchronous motor having minimal slip.

It is another object of the present invention to provide an improved inside-out hysteresis synchronous motor having minimal slip while maintaining bearing preload over temperature extremes.

SUMMARY OF THE INVENTION

In accordance with one aspect of the instant invention there is provided an inside-out hysteresis motor having a hysteresis ring mounted inside a metal motor housing by non-magnetic spacers which serve to hold the hysteresis ring spaced apart from the motor housing. The hysteresis ring is magnetically isolated from the metal housing; however, the thermal expansion loop of the structure through the spacers and the hysteresis ring is maintained to prevent degradation of motor bearing preload.

BRIEF DESCRIPTION OF THE DRAWING

The invention is pointed out with particularity in the appended claims; however, specific objects, features, and advantages of the invention will become more apparent and the invention will best be understood by referring to the following description of the preferred embodiment in conjunction with the accompanying drawing, in which the single FIGURE is a section view of a sensor assembly incorporating a hysteresis motor in accordance with the instant invention.

DESCRIPTION OF THE PREFERRED EMBODIMENT

Referring now to the drawing for a more detailed description of the components, materials, construction, operation and other features of the invention by characters of reference, there is shown a sensor assembly 10 incorporating a hysteresis motor 12 having a fixed axial shaft 14. The shaft 14 is mounted and affixed, at either end thereof, to a structural member, 16, 16', having an orientation fixed with respect to a vehicle (not shown) in which the sensor assembly 10 is installed.

A rotating element of the motor 12 comprises a cylindrical motor housing or sleeve 18 journaled for rotation about the shaft 14 on bearings 20, 22, the spin axis 23 of the motor housing 18 being coaxial with the shaft 14. The motor housing 18 is made from martensitic stainless steel, preferrably 416 stainless steel. The bearings 20, 22 are end-cap ball bearings bonded with a preload to the shaft 14 and pressed into the ends of the motor housing 18. A stator 24 and its associated windings 26 surround the shaft 14 and is affixed thereto. Leads 28 for supplying alternating current to the stator windings 26 emanate from the motor via a central bore 30 in the shaft 14.

A cylindroid hysteresis ring 32 mounted interiorly of the motor housing 18 for rotation therewith between a pair of mounting elements 34, 34'. The hysteresis ring 32 is made of permanent-magnet alloy material, the preferred material being Guterl special steel grade 73. The mounting elements 34, 34' are ring-shaped spacers press fit into the motor housing 18. The mounting elements 34, 34' are made from a non-magnetic material such as austenitic stainless steel, the preferred material being 304 stainless steel. The hysteresis ring 32 is juxtaposed with the stator 24, driving the rotating element of the motor in response to the alternating current applied through the leads 28 to the stator windings 26. The hysteresis ring 32 includes a step or groove 35, 35' machined around each of the peripheral ends thereof. The grooves 35, 35' abut and interlock with corresponding peripheral grooves machined in the edges of each of the spacers 34, 34'. The stepped edges of the spacers 34, 34' support the hysteresis ring 32 thereon and hold the hysteresis ring spaced apart from the motor housing 18, forming an air gap 36 therebetween. The air gap 36 isolates the hysteresis ring 32 magnetically from the motor housing 18, the thermal expansion loop being maintained both through the motor housing 18, and through the spacers 34, 34' and the hysteresis ring 32. Other components of the sensor assembly 10 mounted exteriorly and interiorly of the motor 12 and shown in the drawing, but not described herein, are not germane to the instant invention; however, details of such other components may be found in the aforementioned co-pending application Ser. No. 370,641.

The materials of the motor elements in the bearing thermal expansion loop were selected to keep the loop matched with respect to coefficient of expansion, thereby maintaining the bearing preload over temperature extremes. The thermal expansion loop includes the shaft 18, the bearings 20, 22, the motor housing 18, and the spacers 34, 34' and the hysteresis ring 32. The magnetic isolation of the hysteresis ring dramatically reduced the motor slip to acceptable values.

Obviously, many modifications and variations of my invention are possible in the light of the above teachings. It is therefore understood that my invention may be practiced otherwise than as specifically described and it is intended by the appended claims to cover all such modifications of the invention which fall within the true spirit and scope of the invention.

What is claimed is:

1. An improved inside-out hysteresis motor having a metal motor housing journaled for rotation about a fixed central shaft, and a hysteresis ring mounted interiorly of the motor housing, wherein the improvement comprises: austenitic stainless steel means for mounting the hysteresis ring spaced apart from the motor housing.

2. An improved hysteresis motor having a fixed central shaft, a stator affixed to the shaft; and a rotating element including a motor housing journaled to the shaft, the motor housing having a spin axis coaxial with the shaft, and a cylindrical hysteresis ring mounted inside the motor housing and juxtaposed with the stator, the hysteresis ring driving the rotating element in response to alternating current applied to the stator, wherein the improvement comprises: first and second mounting elements of austenitic stainless steel affixed to the motor housing interiorly thereof at either end of the hysteresis ring, the mounting elements holding the hysteresis ring spaced apart from the motor housing.

3. An improved hysteresis motor having a fixed shaft; a stator affixed to the shaft; and a rotating element including a motor housing of martensitic stainless steel motor to the shaft by bearings bonded with a preload to the shaft and pressed into the motor housing, the motor housing have a spin axis coaxial with the shaft, and a cylindrical hysteresis ring mounted inside the motor housing and juxtaposed with the stator, the hysteresis ring driving the rotating element in response to alternating current applied to the stator, said motor having a thermal expansion loop which includes the stator and the shaft, the bearings, the motor housing, and the hysteresis ring, wherein the improvement comprises: first and second mounting elements of austenitic stainless steel affixed to the motor housing interiorly thereof at either end of the hysteresis ring, the first and second mounting elements holding the hysteresis ring spaced apart from the motor housing, the space between the hysteresis ring and the motor housing forming an air gap providing magnetic isolation between the hysteresis ring and the motor housing, the thermal expansion loop through the hysteresis ring being maintained through the first and second mounting elements.

* * * * *